March 5, 1957 J. J. HERZ ET AL 2,783,960
PALLETS
Filed April 26, 1952 2 Sheets-Sheet 1

INVENTORS.
Julius John Herz
& Robert H. Herz,
By Jas. C. Nobensmith
Attorney.

March 5, 1957 J. J. HERZ ET AL 2,783,960
PALLETS

Filed April 26, 1952 2 Sheets-Sheet 2

INVENTORS.
Julius John Herz
& Robert H. Herz,
By Jas. C. Nobensmith
Attorney.

2,783,960

PALLETS

Julius John Herz and Robert H. Herz, Williamsport, Pa., assignors of one-half to Eastern Wood Products Company, Williamsport, Pa., a corporation of Pennsylvania, and one-half to Acme Pallet Company, New York, N. Y., a corporation of New York Application April 26, 1952, Serial No. 284,528

2 Claims. (Cl. 248—120)

This invention relates to pallets of the type used for the storage and handling of various materials, such as bundled and packaged goods, and it relates more particularly to pallets of the platform type which are adapted to be moved with the load thereon by means of fork lift trucks or the like.

Heretofore the pallets most commonly used for the aforesaid purposes, comprised wooden stringers upon the tops of which transverse floor strips or slats were nailed and ordinarily, but not always, having transverse strips or slats nailed on the bottoms of the stringers.

Such pallets are ordinarily subjected to very rough usage, and it frequently happens that the nails used to secure the cross members to the stringers become loosened, and the heads thereof project above the top surfaces of the cross members. This results in damage to the goods, and to the containers thereof, when the same are placed on the pallets.

Furthermore, in the use of the pallets in which the cross-members are merely nailed to the stringers, the parts often become separated from each other, and repairs are frequently required before the pallets may be re-used.

The principal object of the present invention is to provide pallets which will be more durable than those heretofore used, and which will minimize the need of constant repairs to the pallets between successive uses thereof.

A further object of the invention is to provide pallets in which the likelihood of projecting nail heads or other parts will be eliminated.

A further object of the invention is to provide pallets which will have considerably longer life than those heretofore used.

A further object of the invention is to provide pallets of the character aforesaid which may be inexpensively made.

The nature and characteristic features of the invention will be more readily understood from the following description, taken in connection with the accompanying drawings forming part hereof, in which.

Figure 1:
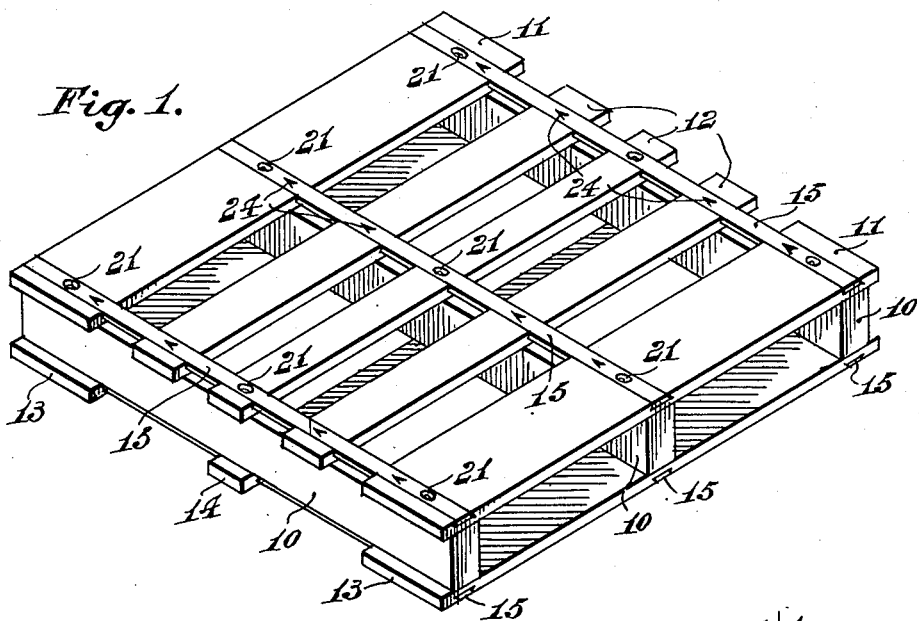
Figure 1 is a perspective view of a pallet embodying the main features of the present invention.

It should, of course, be understood that the description and drawings herein are illustrative merely, and that various modifications and changes may be made in the structures disclosed without departing from the spirit of the invention.

Referring now more particularly to the arrangement shown in Figs. 1 to 4 of the drawings, there is therein shown a preferred form of pallet structure comprising a series of spaced parallel beams or stringers 10, preferably made of wood, to which are secured transverse strips or slats 11 at the end portions of the stringers 10, and intermediate strips or slats 12. The strips 11 and 12 are secured to the top surfaces of the stringers 10 in a manner to be presently described.

There may also be provided, on the bottom, transverse strips 13 at the ends of the stringers 10 similar to the strips or slats 11 at the top, although on the bottom there would ordinarily be a smaller number of transverse intermediate strips 14, and in the present instance but one of these is shown.

Figure 4:
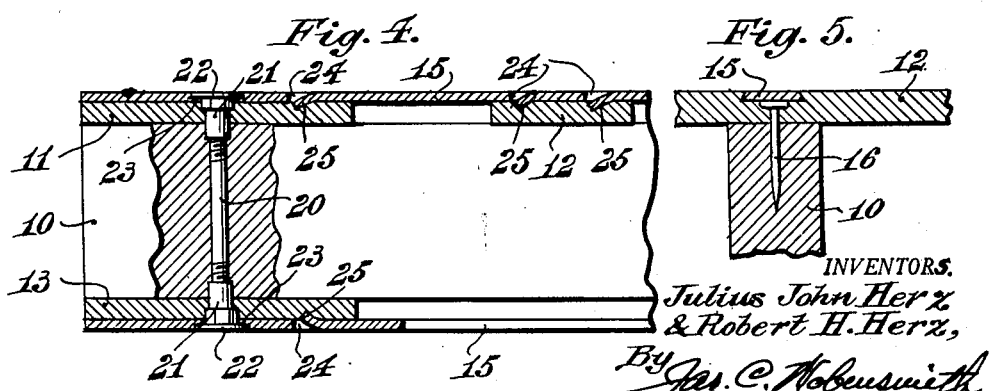
Fig. 4 is a transverse section, enlarged, taken on the line 4—4 of Fig. 2, illustrating more particularly a preferred manner of securing certain of the parts of the structure to each other.

For the purpose of securing the transverse strips or slats to the stringers 10, the arrangement shown more particularly in enlarged detail in Fig. 4 of the drawings is employed, the same primarily comprising locking strips 15 disposed in recesses in the top transverse strips or slats 11 and 12, one above each of the stringers 10, and extending parallel thereto, and also disposed in the recesses in the lower strips or slats 13 and 14 in similar locations.

Figure 2:
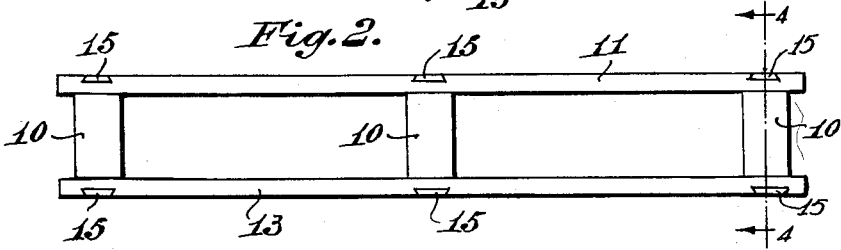
Fig. 2 is an end elevation thereof.
Figure 3:
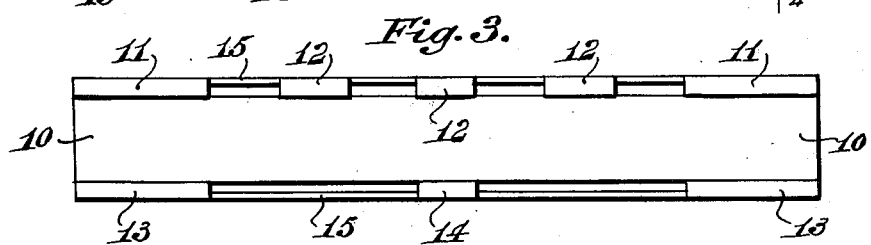
Fig. 3 is a side elevation thereof.
Figure 6:
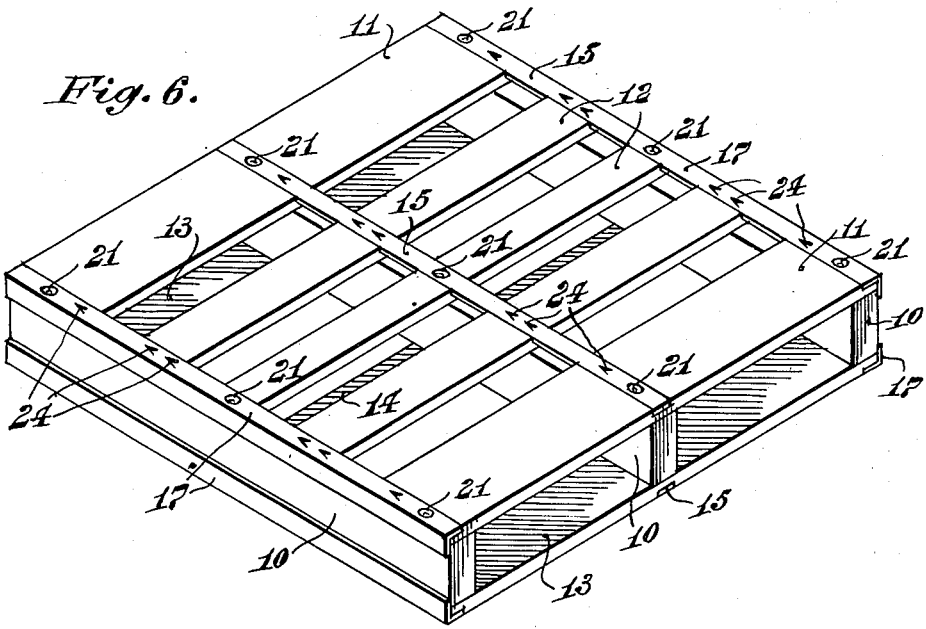
Fig. 6 is a perspective view of a modified form of pallet structure.
Figure 7:
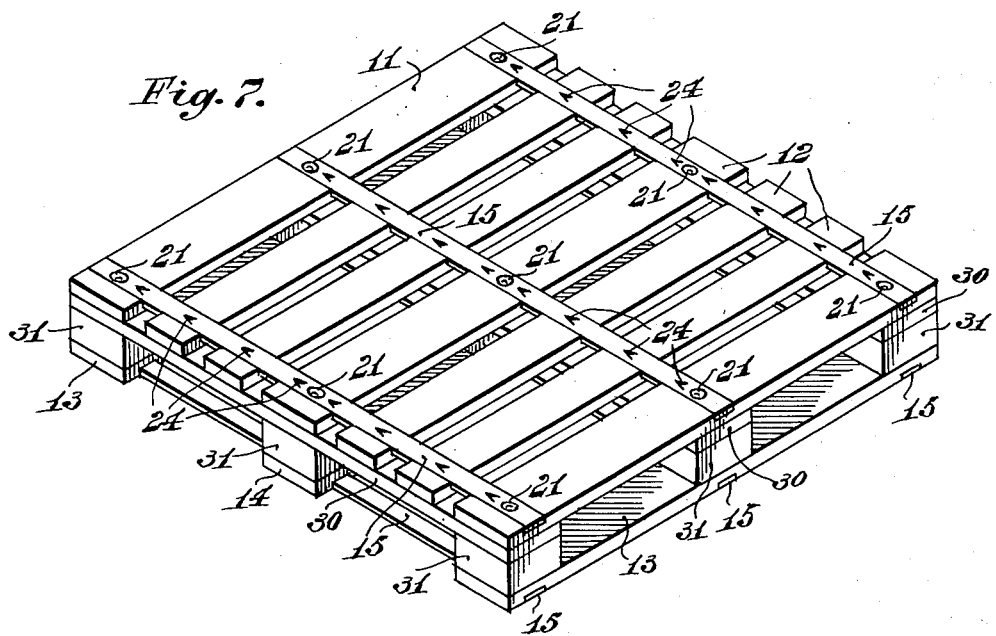
Fig. 7 is a perspective view of another modified form of pallet, utilizing the well known four-way entry principle.

The strips 15 are preferably made of metal, although they can, in some instances, be made of other material, such as plastics or even wood. These strips 15 may be shaped in cross-section so as to be dovetailed in their respective recesses as shown in Figs. 1, 2 and 5, in which case they would be slid into place from end to end, or if made rectangular in cross-section as shown in Figs. 6 and 7 they may be inserted from the top or bottom as the case may be.

At certain spaced locations there are provided bolts 20 extending through the stringers 10 and threaded at both ends, and flanged nuts 21 are mounted on the ends of the bolts 20. The flange portions 22 of the nuts 21 are positioned in recesses 23 in the strips 15, the arrangement being such that by the tightening of the flanged nuts 21 the various parts through which the bolts 20 and nuts 21 extend will be securely fastened to each other.

When the strips 15 are made of metal they may be suitably punched as at 24 at certain locations to provide tangs 25 which may be forced inwardly into the portions of the transverse strips or slats 11, 12, 13 and 14 which they respectively engage, and in this manner sidewise movement of said transverse strips or slats will be effectively prevented.

Figure 5:
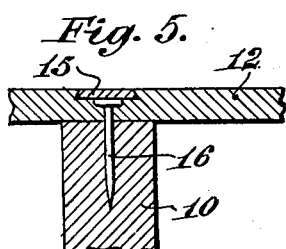
Fig. 5 is a fragmentary section illustrating a modified form of the means for fastening certain of the parts to each other, illustrating more particularly how nails may be used without danger of having the heads protruding.

In Fig. 5 of the drawings there is shown an arrangement in which the transverse strips or slats 11, 12, 13 or 14, as the case may be, are fastened by nails 16 to the stringers 10, after which the locking strip 15 is mounted in place, and when so mounted will serve effectively to prevent the heads of the nails 16 from extending above the top or bottom surface of the pallet.

In Fig. 6 of the drawings there is shown a modified form of structure in which, in lieu of the strips 15 provided adjacent the ends of the transverse strips or slats 11, 12, 13 and 14, there are provided angle irons 17 mounted in recesses in the ends of the transverse strips 11, 12, 13 and 14 which are otherwise held in a manner similar to that shown in Figs. 1 to 4 of the drawings.

In Fig. 7 of the drawings there is shown a form of pallet embodying the present invention but constructed and arranged to provide a four-way entry pallet, whereby the fork of the lift truck may be slid in the space between the top and bottom slats from either of the sides or either of the ends of the pallet.

In this instance, the stringers 10 will be omitted and in lieu thereof there will be provided stringers 30 in flat strip form at the ends of and beneath the transverse strips or slats 11 and 12 constituting the top or floor members of the pallet, and there will also be provided on the bottom at the ends, strips 13 similar to those provided in the form of structure shown in Fig. 1 of the drawings, and likewise, a transverse intermediate strip 14 at the center, and between the stringers 30 and the strips 13, as well as between the stringers 30 and the strip 14, blocks 31 will be provided at each of the corners and intermediate the corners as shown in Fig. 7 of the drawings. The details of the structure shown in Fig. 7 may be otherwise similar to those shown in the preceding views.

It will be noted that by the foregoing arrangement, in either of the forms, there is provided a pallet which will be more durable and lasting than any of the pallets at present in common use, which may be inexpensively constructed, and which will require no special tools or equipment in the assembling thereof.

It will also be noted that, in either of the structures shown, there will be no likelihood of nails becoming loose, or of the heads thereof protruding and causing damage to the goods, or the containers thereof, which are placed on the pallets.

We claim:

1. A knockdown pallet comprising spaced parallel end stringers, upper and lower deck boards extending transversely across opposite surfaces of said stringers and terminating adjacent remote sides thereof, a clamping structure associated with each end stringer including upper and lower clamp members of angle iron section extending across the outer faces of the deck boards and over the outer adjacent ends thereof, means including manually operable threaded members to move said clamp members toward each other to secure said deck boards to said end stringers, and other means coacting with said clamp members to detachably interlock said deck boards and stringers against relative movement, said other means comprising interlocking boss and recess means.

2. A knockdown pallet comprising end stringers, upper and lower deck boards extending transversely across opposite surfaces of said stringers, cooperating boss and recess means for preventing relative movement between the end stringers and deck boards, upper and lower clamp members provided for each end stringer and extending across the outer surfaces of their respective deck boards, and connecting members extending through said stringers and said boss and recess means and interconnecting their respective upper and lower clamp members.

References Cited in the file of this patent

UNITED STATES PATENTS

| | | |
|---|---|---|
| 517,407 | Griffiths | Mar. 27, 1894 |
| 1,409,092 | Goldfield | Mar. 7, 1922 |
| 2,327,847 | Quayle | Aug. 24, 1943 |
| 2,369,944 | Cahners | Feb. 20, 1945 |
| 2,371,106 | Lewis | Mar. 6, 1945 |
| 2,436,554 | Cruickshank | Feb. 24, 1948 |
| 2,491,073 | Barrett | Dec. 13, 1949 |
| 2,651,486 | Woodward | Sept. 8, 1953 |

FOREIGN PATENTS

| | | |
|---|---|---|
| 129,085 | Sweden | Aug. 8, 1950 |